US012438729B2

(12) United States Patent
Soeldner et al.

(10) Patent No.: US 12,438,729 B2
(45) Date of Patent: *Oct. 7, 2025

(54) DIGITAL CONTROL UNIT OF A BIOPROCESS ARRANGEMENT

(71) Applicant: Sartorius Stedim Biotech GmbH, Goettingen (DE)

(72) Inventors: Robert Soeldner, Goettingen (DE); Jonas Austerjost, Rietberg (DE); David James Pollard, Bohemia, NY (US)

(73) Assignee: Sartorius Stedim Biotech GmbH, Goettingen (DE)

( * ) Notice: Subject to any disclaimer, the term of this patent is extended or adjusted under 35 U.S.C. 154(b) by 286 days.

This patent is subject to a terminal disclaimer.

(21) Appl. No.: 18/029,225

(22) PCT Filed: Sep. 16, 2021

(86) PCT No.: PCT/EP2021/075496
§ 371 (c)(1),
(2) Date: Mar. 29, 2023

(87) PCT Pub. No.: WO2022/069245
PCT Pub. Date: Apr. 7, 2022

(65) Prior Publication Data
US 2023/0412391 A1  Dec. 21, 2023

(30) Foreign Application Priority Data

Sep. 30, 2020  (EP) ..................................... 20199395

(51) Int. Cl.
*H04L 9/32*    (2006.01)
*G06F 21/60*   (2013.01)
(Continued)

(52) U.S. Cl.
CPC .......... *H04L 9/3247* (2013.01); *G06F 21/606* (2013.01); *G16H 10/40* (2018.01); *H04L 9/3239* (2013.01); *H04L 9/50* (2022.05)

(58) Field of Classification Search
None
See application file for complete search history.

(56) References Cited

U.S. PATENT DOCUMENTS 8,719,576 B2   5/2014   Buldas et al.
8,846,383 B2   9/2014   Luttmann et al.
(Continued)

FOREIGN PATENT DOCUMENTS

CN    110675150     1/2020
EP      2565832     3/2013
WO   2022069245     4/2022

OTHER PUBLICATIONS

"European Search Report," for European Patent Application No. 20199395 mailed Mar. 10, 2021 (2 pages).
(Continued)

*Primary Examiner* — Lashonda Jacobs-Burton
(74) *Attorney, Agent, or Firm* — Pauly, DeVries Smith & Deffner LLC

(57) ABSTRACT

Various embodiments relate to a digital control unit of a bioprocess arrangement for controlling a bioprocess, wherein the digital control unit comprises a local data storage and a local processor unit, wherein the digital control unit comprises a bioprocess interface for sending and receiving bioprocess control data, wherein the digital control unit is configured to execute a bioprocess control routine via the local processor unit to control the bioprocess, wherein in the bioprocess control routine, the digital control unit generates bioprocess data from the actuator data and/or the sensor data and/or the user control command data. It is proposed that the digital control unit is configured to execute a signing routine (Continued)

via the local processor unit and that in the signing routine, the digital control unit digitally signs documentation data, derived from the bioprocess data, by generating a digital signature.

20 Claims, 3 Drawing Sheets

(51) Int. Cl.
*G16H 10/40* (2018.01)
*H04L 9/00* (2022.01)

(56) References Cited

U.S. PATENT DOCUMENTS

2009/0019549 A1* 1/2009 Reid .................. G06F 21/6209
  726/27
2021/0095239 A1* 4/2021 Recker .................. C12M 23/44

OTHER PUBLICATIONS

"International Search Report and Written Opinion," for PCT Application No. PCT/EP2021/075496 mailed Jan. 17, 2022 (14 pages).
"Your Guide to Upstream Processing Solutions From Research to Production," Sep. 1, 2016, retrieved from the internet on Jan. 22, 2018, URL <https://www.connect-upstream.com/fileadmin/media/pdf/Cata_Upstream_S--1526-e.pdf> pp. 88, 89, 102-104 (108 pages).

* cited by examiner a)

b)

DIGITAL CONTROL UNIT OF A BIOPROCESS ARRANGEMENT

CROSS-REFERENCE TO RELATED APPLICATIONS

This application is a national stage application under 35 U.S.C. 371 of International Patent Application Serial No. PCT/EP2021/075496, entitled "Digital Control Unit of a Bioprocess Arrangement," filed Sep. 16, 2021, which claims priority from European Patent Application No. EP 20199395.3, filed Sep. 30, 2020, the disclosure of which is incorporated herein by reference.

FIELD OF THE TECHNOLOGY

Various embodiments relate to a digital control unit of a bioprocess arrangement for controlling a bioprocess, a bioprocess arrangement with such a digital control unit, a method for operating such a digital control unit, the use of such a digital control unit, a data processing system, a computer program product and a computer readable storage media.

SUMMARY

The term "bioprocess" presently represents biotechnological and biopharmaceutical processes, which are involved in the manufacturing of desired therapeutic bioproducts such as biologics, vaccines, components for cell or gene therapy, or of non-therapeutic bioproducts such as pigments, biofuels or nutritional supplements. Such bioproducts can either be manufactured by living cells, or the cell itself might be the bioproduct, or the bioproduct can be the result of a cell free manufacturing based on cell components that are of either natural or non-natural origin.

The "bioprocess arrangement" comprises at least one device or the combination of two or more devices involved in the bioprocess, such as a bioreactor, a digital control unit (DCU), a filtration device, chromatography equipment, a centrifuge, a freeze dryer and analytical devices, which might be either single-use or multi-use equipment.

For at least partly automatically controlling a bioprocess, the digital control unit in question comes into play. An example for such a digital control unit, which is the starting point for various embodiments, is shown in DE 102 37 082 A1. The known digital control unit comprises electronic components to control the bioprocess, to receive sensor data and to communicate with the user via a user interface. This allows to execute a bioprocess control routine, in which bioprocess data are being generated in order to document the real life execution of the desired bioprocess.

The above noted bioprocess data are particularly important, for example, if a new pharmaceutical product is subject of a compliance procedure before its introduction into the market. Such compliance procedures often require proof, that the respective process in the bioprocess laboratory is in accordance with predefined rules. For instance during clinical trials this is of particular importance due to quality control standards and regulatory measures in clinical research, which are required by the respective national drug agency, such as the FDA, for the approval process of new drugs. However, this does not only concern such experimental phases, in which the documentation of process steps and sensor data is predominantly relevant, but also the manufacturing phase, in which the documentation of process quality plays an important role, according to GMP standards. GMP, or good manufacturing practice, are the practices required to conform to the guidelines recommended by agencies such as the FDA that control the authorization and licensing of the manufacture and sale of pharmaceutical products. These guidelines define the minimal manufacturing requirements that must be fulfilled in order to assure that the respective product is high in quality for its intended use. The accordance with GlVIP standards is overseen by regulatory agencies all over the world.

In any of the above noted cases, the integrity of the bioprocess data is necessary. This means that it has to be ensured that the bioprocess data have not been manipulated, be it willingly or unwillingly.

In order to ensure the integrity of the bioprocess data, it has been proposed to submit the respective data in online calendars and externally signing the data applying a generally known signing method (U.S. Pat. No. 8,719,576 B2). This known concept leaves room to manipulate the bioprocess data within the bioprocess laboratory.

It is an object of various embodiments to provide means that improve the data integrity relating to bioprocess data, that have been generated in a bioprocess, with low effort.

The above noted problem is solved for a digital control unit with the features of the disclosure.

First of all, it has been found out that the data integrity of the bioprocess data may be positively affected by a component, which is present in almost any bioprocess arrangement for controlling a bioprocess. This component, according to various embodiments, is the digital control unit of a bioprocess arrangement, which is the central electronic component for controlling the bioprocess. The expression "control" presently includes any action that attributes to influencing the respective target, here the bioprocess, in a reproducible manner, which generally includes sending out data to the target and retrieving and storing data from the target.

The digital control unit comprises a local data storage and a local processor unit, which presently are to be considered the core components for digital data processing.

The digital control unit further comprises a bioprocess interface for sending and receiving bioprocess control data, which bioprocess interface comprises an actuator interface for sending actuator data to at least one actuator for influencing the bioprocess and a sensor interface for receiving sensor data related to the bioprocess from at least one sensor. For instance, a stirrer or a valve could be such actuators, while the associated, respective actuator data could be the stirring frequency in rounds per minute (rpm), or the fluid flow in milliliter per minute (mL/min), respectively. Exemplary sensors could be the biomass sensor, pH sensor or oxygen sensor, reflecting the respective data.

The digital control unit also generates bioprocess data, which serve to describe the bioprocess as will be explained. These bioprocess data are the basis for the documentation, which is needed for above noted compliance procedures.

Further, the digital control unit comprises a user interface for displaying to a user at least part of the bioprocess data and for receiving user control command data. The user interface provides one possibility for the user to influence the bioprocess during both, the experimental development phase as well as the manufacturing phase. Common, exemplary parameters that are set by the user are stirring speed, temperature, pH, oxygen saturation and the like.

Finally, the digital control unit is configured to execute a bioprocess control routine via the local processor unit to control the bioprocess. Here, all automation takes place, if needed. In the bioprocess control routine, the digital control unit receives the sensor data from the sensor. In addition, in the bioprocess control routine, the digital control unit generates the actuator data based on the user control command data and/or the sensor data and controls the actuator by sending the actuator data to the actuator thereby influencing the bioprocess. This control may be based on a simple logic operation between the user control command data and/or the sensor data to derive the actuator data. It may also be based on a control loop, that derives actuator data in order to reach a certain target value. Finally, it may be based on a sequence control, that is usually realized by a software noted below. Accordingly, the digital control unit may provide a coordination function for the whole bioprocess on the one hand, and may also be only an execution tool to execute requests from at least one other control unit on the other hand.

In the bioprocess control routine, the digital control unit also generates the bioprocess data from the actuator data and/or the sensor data and/or the user control command data.

The overall concept underlying various embodiments is now to perform a complete signing routine within the digital control unit including the generation of a digital signature for the bioprocess data, in order to improve the data integrity relating to these bioprocess data. This means, that the digital control unit is made a trusted device regarding the generation of the above noted digital signature.

In detail, private key data are stored in the local data storage, which is the basis for the execution of a data safety routine. The digital control unit is configured to execute this data safety routine via the local processor unit, which is also configured to execute the bioprocess control routine as noted above.

The digital control unit is also configured to execute a documentation routine via the above noted processor unit in the data safety routine. In the documentation routine, the digital control unit generates documentation data from the bioprocess data, which documentation data are subject to signature to be explained in the following.

Accordingly, the digital control unit is configured to execute a signing routine via the above noted local processor unit in the data safety routine, wherein in the signing routine, the digital control unit extracts a cryptographic private key from the private key data and digitally signs the documentation data with the cryptographic private key by generating a digital signature. In short, in the signing routine, which is performed completely in the local processor unit, a digital signature of the documentation data is performed based on asymmetric cryptography, which as such is well known from the state of the art.

The above noted extraction of the cryptographic private key from the private key data is particularly simple, if the private key data include the cryptographic key or are even identical to the cryptographic private key. However, the extraction may be more complex. For example, the cryptographic private key may be derived from the private key data based on an unpredictable random number.

It is remarkable, that, in some embodiments, not only the signing routine, but also the documentation routine, in which the documentation data to be signed are generated, are each completely executed in the local processor unit.

As the safety routine may be designed, such that very little data processing is needed for generating the digital signature, the proposed solution may be realized with a wide range of existing digital control units without even adding any additional hardware. This is not only a cost advantage, but also facilitates the introduction of the proposed solution into existing laboratories.

As the digital control unit in question is the one electronic control member, which is the closest to the sensors and actuators of the bioprocess arrangement, there remains hardly any opportunity to manipulate relevant bioprocess data. With the proposed solution, there is also no need for complex concepts such as distributed ledger technology (DLT), which require a consensus algorithm such as proof of work or proof of stake.

According to various embodiments, in the documentation routine, the bioprocess data are grouped into data blocks, which data blocks are then processed in a step of hashing. According to various embodiments, the data blocks are being hashed in form of a tree structure such as a Merkle tree structure. The signing of these documentation data, which may include the complete hash tree structure or which may also include only the hash root, in any case require only little data processing as noted above.

Various embodiments are directed to variants regarding the data stream of the bioprocess data. In order to prevent manipulation of the bioprocess data, the documentation routine and also the signing routine can be being executed during control of the bioprocess in the bioprocess control routine. This is advantageous in particular in view of the signing routine, as after executing the signing routine, no unnoticed amendment of the bioprocess data is possible.

Various embodiments are directed to more than one signing routine being executed within the bioprocess. Here, it can be that subsequent bioprocess data sets, that are assigned to subsequent signing routines, are linked to each other one way or another, in order to ensure that no data between two subsequent bioprocess data sets are being missed. In some embodiments, that in the signing routine, the digital control unit adds time stamps to the documentation data. Here, time information in the digital control unit provides the necessary reference.

In order to further reduce the opportunity to manipulate the bioprocess data, the sensor data and/or the user control command data are protected from external manipulation, after receipt by the digital control unit. For this, it can be provided that via the user interface and also via any other interface, these data may not be amended.

There are various embodiments possible for the generation of the bioprocess data. Besides simply sequentially arranging the respective sensor data, actuator data and user control command data, it is well possible to generate a link information regarding a logical relation between at least part of these data and to generate the bioprocess data also based on this link information. This link information may, for example, be the logical relation between controlling an actuator and the expected change in sensor data.

Various embodiments are directed to structural setups regarding the digital control unit. Here it becomes clear that the digital control unit in question provides process-oriented control structures such as a control loop and that even the hardware of the digital control unit is directly linked to the bioprocess. The intermediate link between the digital control unit and the sensor and/or actuator is made explicit with the, in some embodiments, direct data-wise connection between the bioprocess interface to the sensor and/or the actuator. The expression "direct" means, that no data processing is taking place between the sensor and/or actuator and the bioprocess interface.

The digital signature generated based on the documentation data may be stored in the local data storage of the digital control unit. It may also be stored in any other data storage, that is connected to the digital control unit via a data transmission interface. Both possibilities are subject to various embodiments to clarify, that after executing the signing routine, unnoticed manipulation of the bioprocess data is not possible as noted above, such that the location of storage of the digital signature does not play any role.

According to various embodiments, the whole bioprocess arrangement with a proposed digital control unit is provided.

The proposed bioprocess arrangement can include a bioreactor and all components and/or devices performing the corresponding upstream and downstream processing phases.

The upstream processing phase of a bioprocess generally consists of all actions and workflows from the development, optimization, screening and selection of a strain or cell line to its cultivation and the manufacturing of the desired bioproduct by the cell or cell components. This cultivation can be performed in various scales (microliter scale to several thousands of liters scale) using different reactor setups and geometries (rocking motion, stirred tank, bubble column, fixed bed, etc.) by applying different modes of operation (batch, fed-batch, continuous, in particular perfusion, or combinations thereof). The cultivation is usually monitored, analyzed and controlled based on different sensor technologies (soft, electrochemical, biochemical, optical, etc.; offline, online, inline, atline). Typically, after the manufacturing of a desired bioproduct, it is purified. Here, the cultivation broth is separated from the desired bioproduct (e. g. monoclonal antibodies, polyketides, enzymes, vaccines).

The downstream processing phase of a bioprocess generally includes various techniques and methods for recovery, purification, analysis and characterization of the desired bioproduct. It involves methods, such as cell disruption, sedimentation, centrifugation, precipitation, crystallization, extraction, filtration, adjustment of pH and conductivity of liquids, enzymatic or chemical modification, dilution, buffer exchange, evaporation, adsorption and chromatography. Analysis and characterization steps may be included to ensure the purified bioproduct is compliant to critical quality attributes (e.g. glycosylation patterns of antibodies, concentration of endotoxins). A final formulation step, which involves buffer exchange, drying, freeze-drying or crystallization, might be performed to bring the purified bioproduct in a suitable state for storage and distribution before it is filled and packaged.

Another variant includes an arrangement performing an upstream process, which is continuously connected to a downstream arrangement.

All explanations given regarding the proposed digital control unit, the method for operating such a digital control unit, the use of such a digital control unit, the data processing system, the computer program product and the computer readable storage media are fully applicable to the bioprocess arrangement.

Various embodiments are directed to a method for operating the proposed digital control unit.

The proposed method represents the working principle of the proposed digital control unit, such that, again, reference may be made to all explanations given with regard to the proposed digital control unit.

Various embodiments directed to the use of the proposed digital control unit for digitally signing the documentation data with the cryptographic private key. Again, all explanations given with regard to the proposed digital control unit are fully applicable.

Various embodiments are directed to the data processing system for the realization of the proposed method, in particular for the realization of the respective routines. In various embodiments, this data processing system comprises at least the local data storage and the local processor unit of the digital control unit. All explanations given with regard to the proposed digital control unit are again fully applicable to the proposed data processing system.

In various embodiments, a computer program product for the proposed data processing system is provided. The computer program product is configured to realize the proposed method, in particular, to realize the above noted routines. Again, all explanations given for the proposed method are fully applicable to the proposed computer program product.

In various embodiments, a computer readable storage media, on which the computer program is stored, is provided as such. Again all explanations given for the proposed method are fully applicable to the proposed readable storage media.

Various embodiments provide a digital control unit of a bioprocess arrangement for controlling a bioprocess, wherein the digital control unit comprises a local data storage and a local processor unit, wherein the digital control unit comprises a bioprocess interface for sending and receiving bioprocess control data, wherein the bioprocess interface comprises an actuator interface for sending actuator data to at least one actuator for influencing the bioprocess, wherein the bioprocess interface comprises a sensor interface for receiving sensor data related to the bioprocess from at least one sensor, wherein the digital control unit generates bioprocess data, wherein the digital control unit comprises a user interface for displaying to a user at least part of the bioprocess data and for receiving user control command data, wherein the digital control unit is configured to execute a bioprocess control routine via the local processor unit to control the bioprocess, wherein in the bioprocess control routine, the digital control unit receives the sensor data from the sensor, wherein in the bioprocess control routine, the digital control unit generates the actuator data based on the user control command data and/or the sensor data and controls the actuator by sending the actuator data to the actuator thereby influencing the bioprocess, wherein in the bioprocess control routine, the digital control unit generates the bioprocess data from the actuator data and/or the sensor data and/or the user control command data, wherein private key data are stored in the local data storage, that the digital control unit is configured to execute a data safety routine via the local processor unit, that the digital control unit is configured to execute a documentation routine via the local processor unit in the data safety routine, that in the documentation routine, the digital control unit generates documentation data from the bioprocess data, that the digital control unit is configured to execute a signing routine via the local processor unit in the data safety routine and that in the signing routine, the digital control unit extracts a cryptographic private key from the private key data and digitally signs the documentation data with the cryptographic private key by generating a digital signature.

In various embodiments, the documentation routine comprises a step of grouping the bioprocess data into data blocks and a step of hashing the data blocks generating hashes of the data blocks and that the documentation data are generated from the hashes of the data blocks.

In various embodiments, the documentation routine comprises a step of hashing the hashes of the data blocks in form of a tree structure, in particular a Merkle tree structure, into a hash root and that the documentation data are generated from the hash root.

In various embodiments, the digital control unit executes the documentation routine and, in some cases, the signing routine during control of the bioprocess in the bioprocess control routine.

In various embodiments, the step of grouping the bioprocess data into data blocks and/or the step of hashing the data blocks is/are initiated with the start of the bioprocess.

In various embodiments, during at least part of a single bioprocess the digital control unit continuously receives the sensor data from the sensor in the bioprocess control routine and continuously sends actuator data to the actuator thereby influencing the bioprocess and that the signing routine is executed a first time and at least a further time during a single bioprocess, wherein a subsequent signing routine, which is based on a subsequent bioprocess data set, is being executed subsequently to a previous signing routine, which is based on a previous bioprocess data set.

In various embodiments, the respective previous bioprocess data set and the respective subsequent bioprocess data set are overlapping each other.

In various embodiments, the digital control unit adds an identifier of the respective previous bioprocess data set to the respective subsequent bioprocess data set.

In various embodiments, in the signing routine, the digital control unit adds time stamps to the documentation data.

In various embodiments, after receipt by the digital control unit, the sensor data and/or the user control command data are protected from external manipulation.

In various embodiments, in the bioprocess control routine, the digital control unit generates the bioprocess data based on the sensor data and/or the actuator data and/or the user control command data.

In various embodiments, in the bioprocess control routine, the digital control unit generates a link information regarding a logical relation between at least part of the sensor data and/or the actuator data and/or the user control command data and generates the bioprocess data also based on the link information.

In various embodiments, the digital control unit is configured to execute a feedback routine for realizing a control loop thereby influencing the bioprocess.

In various embodiments, the digital control unit has a casing, that the local processor unit and the local data storage are completely located in or on the casing, and/or, that the digital control unit is a mobile unit that can be moved with the local processor unit and the local data storage through a laboratory, and/or, that the bioprocess interface is connected via, in particular electrical, cables and/or short range wireless communication to the sensor and/or the actuator, and/or, that the user interface comprises a user display and a user input device, in particular a touch screen, located in or on the casing.

In various embodiments, the bioprocess interface comprises a direct, electrical data-wise connection to the sensor and/or the actuator.

In various embodiments, the digital signature generated by signing the documentation data is stored in the local data storage, and/or, that the digital control unit comprises a data transmission interface and that the digital control unit transmits the digital signature and/or the documentation data and/or the bioprocess data or parts of the respective data to an external data storage, in particular a process control system, via the data transmission interface.

Various embodiments provide a bioprocess arrangement with a digital control unit according to the disclosure.

Various embodiments provide a method for operating a digital control unit according to the disclosure, wherein the digital control unit generates bioprocess data, wherein the digital control unit comprises a user interface for displaying to a user at least part of the bioprocess data and for receiving user control command data, wherein the digital control unit is configured to execute a bioprocess control routine via the local processor unit to control the bioprocess, wherein in the bioprocess control routine, the digital control unit receives the sensor data from the sensor, wherein in the bioprocess control routine, the digital control unit generates the actuator data based on the user control command data and/or the sensor data and controls the actuator by sending the actuator data to the actuator thereby influencing the bioprocess, wherein in the bioprocess control routine, the digital control unit generates the bioprocess data from the actuator data and/or the sensor data and/or the user control command data, wherein private key data are stored in the local data storage, that the digital control unit is configured to execute a data safety routine via the local processor unit, wherein the digital control unit is configured to execute a documentation routine via the local processor unit in the data safety routine, wherein in the documentation routine, the digital control unit generates documentation data from the bioprocess data, wherein the digital control unit is configured to execute a signing routine via the local processor unit in the data safety routine and wherein in the signing routine, the digital control unit extracts a cryptographic private key from the private key data and digitally signs the documentation data with the cryptographic private key by generating a digital signature.

Various embodiments provide a use of a digital control unit according to the disclosure for digitally signing the documentation data with the cryptographic private key, wherein the digital control unit generates bioprocess data, wherein the digital control unit comprises a user interface for displaying to a user at least part of the bioprocess data and for receiving user control command data, wherein the digital control unit is configured to execute a bioprocess control routine via the local processor unit to control the bioprocess, wherein in the bioprocess control routine, the digital control unit receives the sensor data from the sensor, wherein in the bioprocess control routine, the digital control unit generates the actuator data based on the user control command data and/or the sensor data and controls the actuator by sending the actuator data to the actuator thereby influencing the bioprocess, wherein in the bioprocess control routine, the digital control unit generates the bioprocess data from the actuator data and/or the sensor data and/or the user control command data, wherein private key data are stored in the local data storage, that the digital control unit is configured to execute a data safety routine via the local processor unit, wherein the digital control unit is configured to execute a documentation routine via the local processor unit in the data safety routine, wherein in the documentation routine, the digital control unit generates documentation data from the bioprocess data, wherein the digital control unit is configured to execute a signing routine via the local processor unit in the data safety routine and wherein in the signing routine, the digital control unit extracts a cryptographic private key from the private key data and digitally signs the documentation data with the cryptographic private key by generating a digital signature.

Various embodiments provide a data processing system for realizing the method according to the disclosure.

Various embodiments provide a computer program product for the data processing system according to the disclosure.

Various embodiments provide a computer readable storage media, on which the computer program product according to disclosure is stored, such as in a non-volatile manner.

BRIEF DESCRIPTION OF THE DRAWINGS

In the following, various embodiments are explained with respect to the drawings. The drawings show FIG. 1 a proposed digital control unit of a proposed bioprocess arrangement, FIG. 2 the working principle of the digital control unit according to FIG. 1 including a bioprocess control routine and a data safety routine and FIG. 3 a hash tree structure a) as generated in the data safety routine according to FIG. 2 and b) a respective hash tree structure based on manipulated bioprocess data.

DETAILED DESCRIPTION

The proposed digital control unit 1 of a bioprocess arrangement 2 serves for controlling a bioprocess such as a cultivation process of microorganisms or mammalian cells using a bioreactor 3 and components for the corresponding upstream and downstream process (not displayed).

Figure 1:
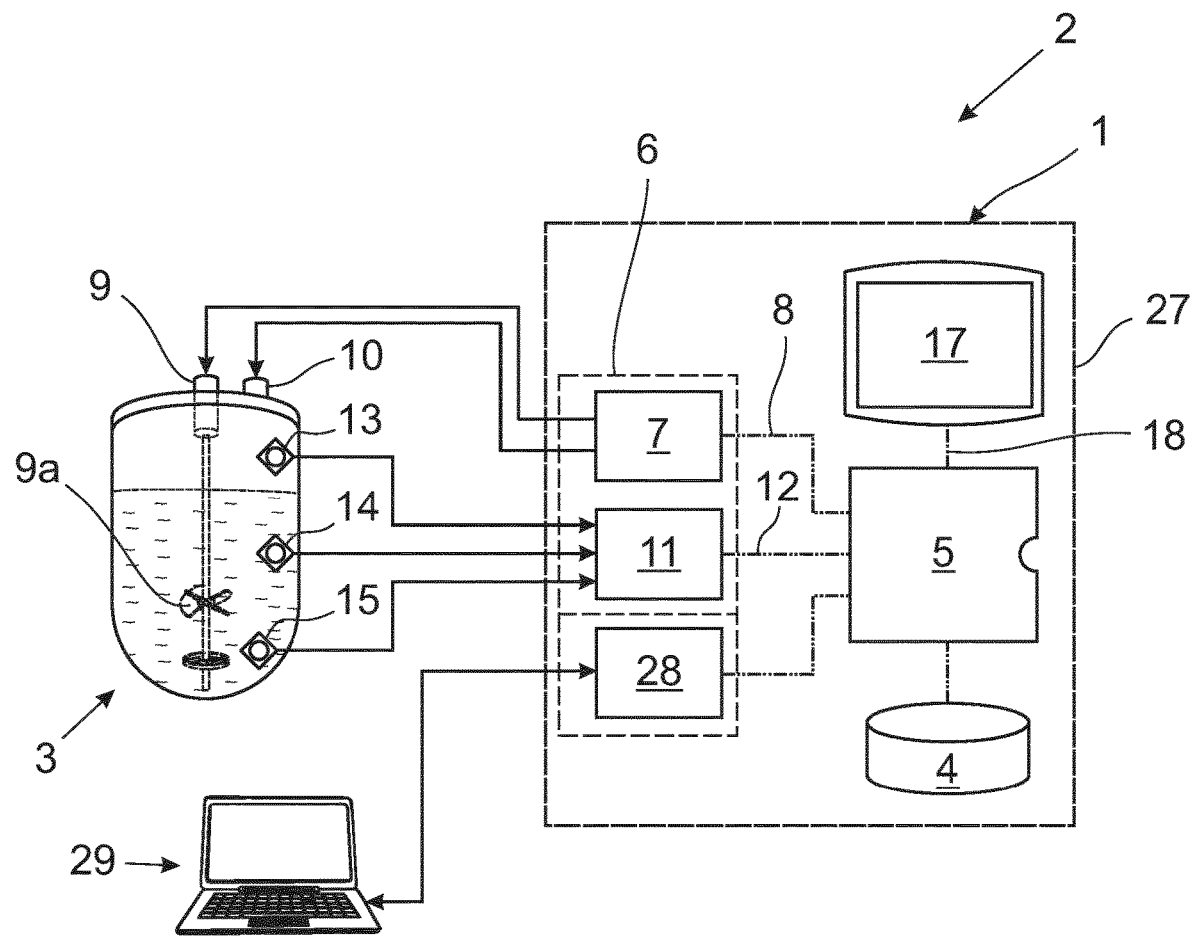

As shown in FIG. 1, the digital control unit 1 comprises a local data storage 4 and a local processor unit 5 for data processing. Both units 4, 5, namely the local data storage 4 and the local processor unit 5, are realized as electronic components. It may be pointed out, that the local processor unit 5 can include only one data processor, which performs all functions of the digital control unit 1. However, it may be provided, that the local processor unit 5 comprises more than one data processor, that interact with each other in order to perform all functions of the digital control unit 1.

As also shown in FIG. 1, the digital control unit 1 comprises a bioprocess interface 6 for sending and receiving bioprocess control data. In particular, the bioprocess interface 6 comprises an actuator interface 7 for sending actuator data 8 to at least one actuator 9, 10 for influencing the bioprocess. The actuator 9, 10 is to be understood as any component, that may be controlled to be actuated, in order to influence the bioprocess. Here, the actuator 9 is a stirrer comprising an impeller 9a within the bioreactor 3, while the actuator 10 can be a valve for introducing fluid, such as a nutrient solution, into the bioreactor 3. Other possible actuators are pumps, liquid handling units, heating and/or cooling systems, or the like. It may be pointed out that the bioprocess arrangement 2 may comprise any number of actuators 9, 10 that each may be controlled by the actuator data 8. Furthermore, the bioprocess arrangement is not limited to upstream devices.

The bioprocess interface 6 also comprises a sensor interface 11 for receiving sensor data 12 related to the bioprocess from at least one sensor 13, 14, 15. Such sensor 13, 14, 15 may be any sensor relevant to describe the bioprocess such as the biomass sensor, pH sensor or oxygen sensor, or the like. The function of those sensors may well be provided by soft sensors, that are also called "virtual sensors". Soft sensors derive sensor values from other sensing sources based on a data model. Depending on the application, there are various possibilities to realize the necessary data processing hardware assigned to the respective soft sensor.

A sensor 13, 14, 15 in the above noted sense may be provided with its own sensor interface 11, that allows its connection to the bioprocess interface 6, such as its sensor interface 11, for the transfer of sensor data 12. Depending on its working principle, the sensor 13, 14, 15 may be connected to the sensor interface 11 of the bioprocess interface 6 for example via an electric, an optic, a pneumatic or a hydraulic connection. In the embodiment shown in FIG. 1 and only as an example, an electric connection is indicated. Again, the bioprocess arrangement 2 may comprise any number of sensors 13, 14, 15, which each provide sensor data 12 to the digital control unit 1.

The digital control unit 1 generates bioprocess data 16, that serve to describe the bioprocess and that will be described in the following. The bioprocess data 16, just after their generation, are adding up to a continuous data stream S shown in FIG. 2.

The digital control unit 1 also comprises a user interface 17 for displaying to a user at least part of the bioprocess data 16 and for receiving the user control command data 18. These user control command data 18 may be a command to start and terminate the bioprocess and/or to set certain control parameters such as the stirring speed of the impeller 9a, which the actuator 9 is assigned to.

Figure 2:
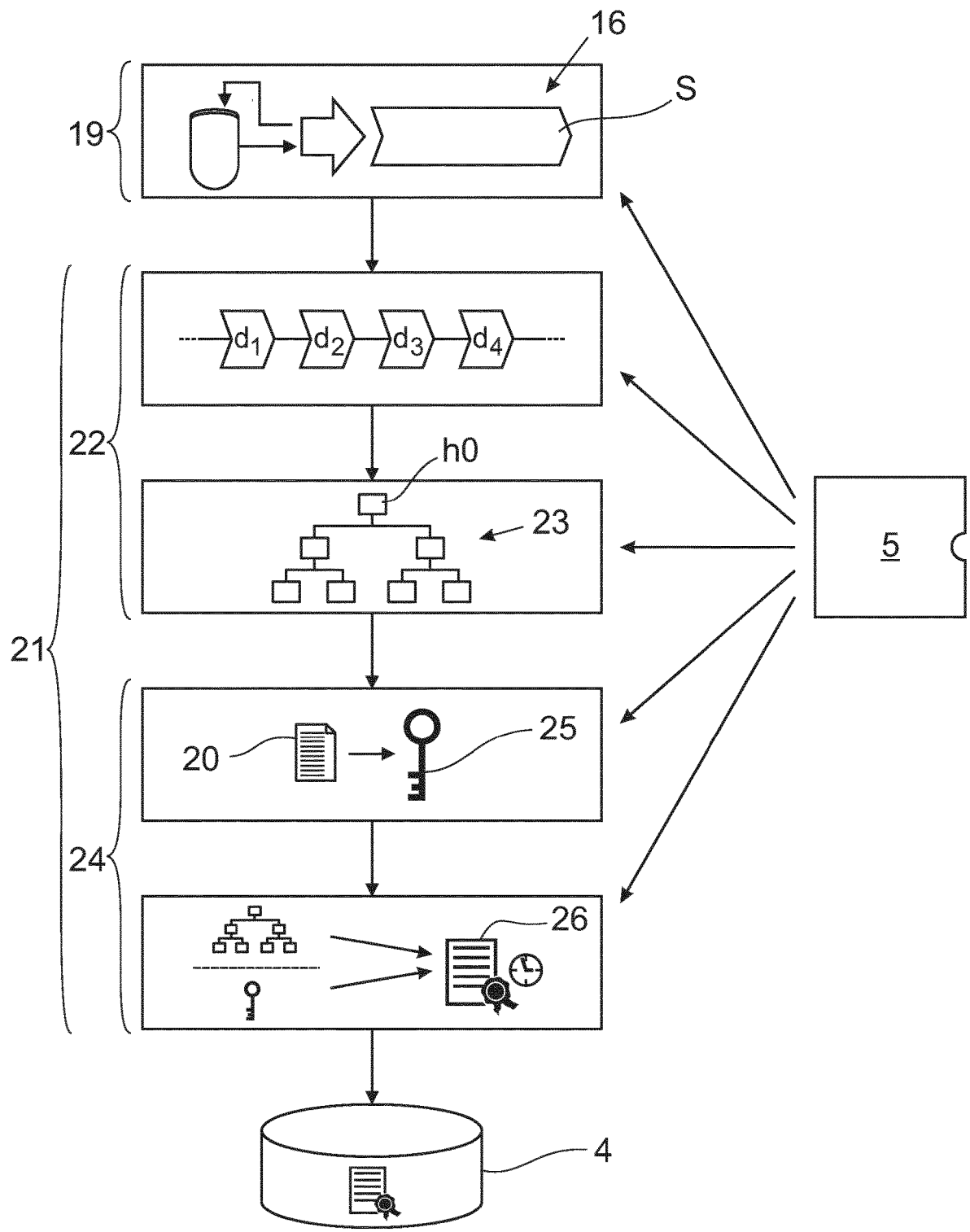

Further, the digital control unit 1 is configured to execute a bioprocess control routine 19 via the local processor unit 5 to control the bioprocess. This is indicated in FIG. 2 as well. In the bioprocess control routine 19, the digital control unit 1 receives the sensor data 12 from the respective sensor 13, 14, 15. In the bioprocess control routine 19, the digital control unit 1 also generates the actuator data 8 based on the user control command data 18 and/or the sensor data 12 and controls the actuator 9, 10 by sending the actuator data 8 to the actuator 9, 10 thereby influencing the bioprocess. From the actuator data 8 and/or the sensor data 12 and/or the user control command data 18, in the bioprocess control routine 19, the digital control unit 1 generates the bioprocess data 16.

The bioprocess control routine 19 can be based on a control software running on the local processor unit 5, which may be structured as a sequence program, which may include rules to control the actuator 9, 10, control loops or the like.

As noted above, according to some embodiments, data integrity with respect to the bioprocess data 16 is ensured by applying asymmetric cryptography within the digital control unit 1, with the digital control unit 1 being a trusted device. For this, first of all, private key data 20 are stored in the local data storage 4. Second, the digital control unit 1 is configured to execute a data safety routine 21 via the local processor unit 5. The data safety routine 21 is relying on a safety software, which is run on the local processor unit 5 as well.

The safety routine 21 includes a documentation routine 22. In detail, the digital control unit 1 is configured to execute the documentation routine 22 via the local processor unit 5 within the data safety routine 21. In this documentation routine 22, the digital control unit 1 generates documentation data 23 from the bioprocess data 16, which documentation data 23 are subject to digital signing.

It is essential for some embodiments that the data safety routine 21 includes a signing routine 24. Accordingly, the digital control unit 1 is configured to execute the signing routine 24 via the local processor unit 5 in the data safety routine 21 and that in the signing routine 24, the digital control unit 1 extracts a cryptographic private key 25 from the private key data 20 and digitally signs the documentation data 23 with the cryptographic private key 25 by generating a digital signature 26.

As indicated in FIG. 2, the documentation routine 22 comprises a step of grouping the bioprocess data 16 into data blocks $d_i$ and a step of hashing the data blocks $d_i$ generating hashes $h_i$ of the data blocks $d_i$, wherein the documentation data 23 are generated from the hashes $h_i$ of the data blocks $d_i$. In some embodiments, the documentation routine 22 comprises a step of hashing the hashes $h_i$ of the data blocks $d_i$ in form of a tree structure applying a standard hash function. The resulting hash tree H is shown in FIG. 3a). Here, this tree structure is a Merkle tree structure.

In some embodiments, the data blocks $d_i$ are hashed in form of a tree structure into a hash root h0, wherein the documentation data 23 are generated from the hash root h0. In a particularly simple variant, the documentation data 23 are identical to the hash root h0.

An important advantage of the above noted hashing is the fact that any and all amendments of the data blocks $d_i$ will lead to a corresponding amendment of the hash root h0, such that any amendment in the data blocks $d_i$ after hashing may easily be detected. A further advantage is the fact that it is only the hash root h0, that has to be introduced into the documentation data 23, which leads to easy data handling with low data processing requirements.

For the above noted hashing, various algorithms may be applied. Here, the hash algorithms "SHA-1", "SHA-2", "BLAKE2" may be applied. For the above noted signing, in some embodiments, an elliptic curve digital signature algorithm, in particular the signature algorithm "ECDSA", may be applied.

In order to reduce the opportunity for manipulating the bioprocess data 16 as much as possible, the digital control unit 1 executes the documentation routine 22, here and in some embodiments also the signing routine 24, during control of the bioprocess in the bioprocess control routine 19.

Especially during long term bioprocesses, that may extend over a number of days or even weeks, it can be that the signing routine 24 is executed more than once during the single bioprocess. Here, during at least part of the single bioprocess, the digital control unit 1 continuously receives the sensor data 12 from the sensor 13, 14, 15 in the bioprocess control routine 19 and continuously sends actuator data 8 to the actuator 9, 10 thereby influencing the bioprocess. The term "continuously" here generally means, that the respective actions, here the reception of sensor data 12 and the sending of actuator data 8, are being ongoingly and systematically, such as periodically, repeated.

The step of grouping the bioprocess data 16 into data blocks $d_i$ and/or the step of hashing the data blocks $d_i$ can be initiated with the start of the bioprocess. Here, the signing routine 24 is executed a first time and at least a further time during the single bioprocess, wherein a subsequent signing routine 24, which is based on a subsequent bioprocess data step, is being executed subsequently to a previous signing routine 24, which is based on a previous bioprocess dataset. Here, the respective previous bioprocess dataset and the respective subsequent bioprocess dataset are overlapping each other, such that it is ensured that all data of the bioprocess data 16 are being included into the signing routine 24.

In order to ensure, that the documentation data 23 represent the sequence of the bioprocess data correctly, it may also be provided, that the digital control unit 1 adds an identifier of the respective previous bioprocess dataset to the respective subsequent bioprocess dataset.

For the same reason it may also be provided that in the signing routine 24, the digital control unit 1 adds time stamps to the documentation data 23. This time stamp accordingly relates to the time of executing the signing routine 24. As an alternative or in addition, the bioprocess data 16 may include a time stamp for each bioprocess data item defining its creation.

In order to further prevent a manipulation of bioprocess data 16, it is also in some embodiments, that after receipt by the digital control unit 1, the sensor data 12 and/or the user control command data 18 are protected from external manipulation. This may be done by control measures or by mechanical measures. The control measures may, for example be a specific design of the control software and/or the safety software, such that access to the respective data is not possible via the user interface 17. Mechanical measures in this sense are to design the digital control unit 1 altogether in a mechanically robust fashion.

In the bioprocess control routine 19, as noted above, the digital control unit 1 generates the bioprocess data 16 based on the sensor data 12 and/or the actuator data 8 and/or the user control command data 18. According to the easiest approach, these data are sequentially arranged based on specific rules, that define, which of these data are to be assigned to the documentation data 23. In some embodiments, each data item of the bioprocess data 16 comprises at least the above noted, individual time stamp, a data item name and a data item value.

Generally it can be that the generation of the bioprocess data 16 is done continuously, such as periodically with a period defined with relation to time or data volume. In addition, the step of grouping the bioprocess data 16 into data blocks $d_i$ during the documentation routine 22 can be done continuously as well. Also the hashing of the data blocks $d_i$ during the documentation routine 22 can be performed continuously. This continuous generation of bioprocess data 16, grouping into data blocks $d_i$ and hashing is advantageous, as the time frame, in which manipulation of data is still possible, is narrowed to a minimum.

As a result of the above, it is to be expected, that for an individual time stamp, a whole number of bioprocess data items exist, which have to be arranged in the bioprocess data 16. In order to ensure a deterministic generation of the bioprocess data 16, such as, the data items of the bioprocess data 16 of the same individual time stamp are arranged in the bioprocess data 16 according to a predefined, total order function, for example a predefined sorting function.

According to another approach, however, it is provided, that in the documentation routine 22, the digital control unit 1 generates a link information regarding the logical relation between at least part of the sensor data 12 and/or the actuator data 8 and/or the user control command data 18 to each other and generates the bioprocess data 16 also based on the link information.

The digital control unit 1, as its core task, controls the bioprocess by communicating with the actuator 9, 10 and the sensor 13, 14, 15. For this, the digital control unit 1 is configured to execute a feedback routine for realizing a control loop as noted above thereby influencing the bioprocess. Such control loop may serve to keep certain sensor data 12 stable by controlling the actuator 9, 10 accordingly.

Here, the digital control unit 1 has a casing 27, which should be robust as also noted above in order to prevent manipulation. As an alternative or in addition, the digital control unit 1 is a mobile unit that can be moved with the local processor unit 5 and the local data storage 4 through a laboratory. Again as an alternative or in addition, it is provided, that the local processor unit 5 and the local data storage 4 are connected via, here electrical, cables and/or short range wireless communication to the sensor 13, 14, 15 and/or the actuator 9, 10. Again, as an alternative or in addition, the user interface 17 may well comprise a user display and a user input device, in particular a touch screen, each of which are located in or on the casing 27 of the digital control unit 1.

In some embodiments, the bioprocess interface 6 comprises a direct, electrical data-wise connection to the sensor 13, 14, 15 and/or the actuator 9, 10. This further reduces opportunities to manipulate data within the connection. Regarding the definition of the expression "direct", reference is made to the above.

In some embodiments, the digital signature 26 generated by signing the documentation data 23 is stored in the local data storage 4. The digital control unit 1, as an alternative or in addition, may comprise a data transmission interface 28, wherein the digital control unit 1 transmits the digital signature 26 and/or the documentation data 23 and/or the bioprocess data 16 or parts of the respective data to an external data storage 29, which generally may be a process control system, which itself may well be another digital control unit. Here, the external data storage 29 is a so called "multifermenter" control system (MFCS), which comprises a local processor unit and a local data storage itself. The MFCS also provides a centralized process management system, dispatching requests to the digital control unit 1, which, however, does not play a role for various embodiments.

The proposed solution is particularly advantageous in a situation, in which bioprocess data, that have been generated in a biotechnological environment during the bioprocess, shall be transmitted from a sender to a recipient. As an example, at least the bioprocess data 16 as well as the digital signature 26, are being sent to the recipient. The sender may be the operator of the biotechnological environment, in which the respective bioprocess has been executed. The recipient may be a governmental organisation applying a compliance procedure to the bioprocess in question.

Based on the digital signature 26 of the of the documentation data 23, the recipient of the bioprocess data 16 is able to verify the integrity of these bioprocess data 16. For this, the public key, which corresponds to the cryptographic private key 25, has also to be made available to the recipient. The public key may be provided by the sender of the bioprocess data 16 directly to the recipient or using a trusted key infrastructure (TKI).

With the above noted public key, the recipient may decrypt the digital signature 26 to receive the documentation data 23, which may be the hash root h0 or the complete hash tree H shown in FIG. 3a). Now applying the respective hash function to the received bioprocess data 16 leads to a hash tree, which is called the "verification hash tree V" in the following and which is shown in FIG. 3b).

Figure 3:
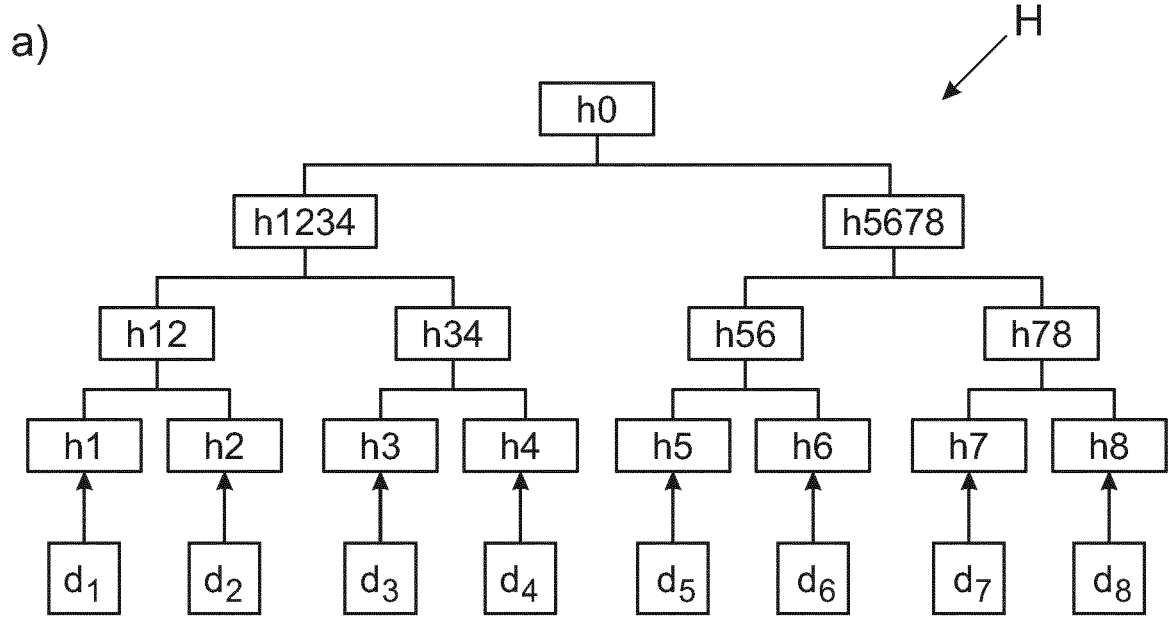
Figure 3:
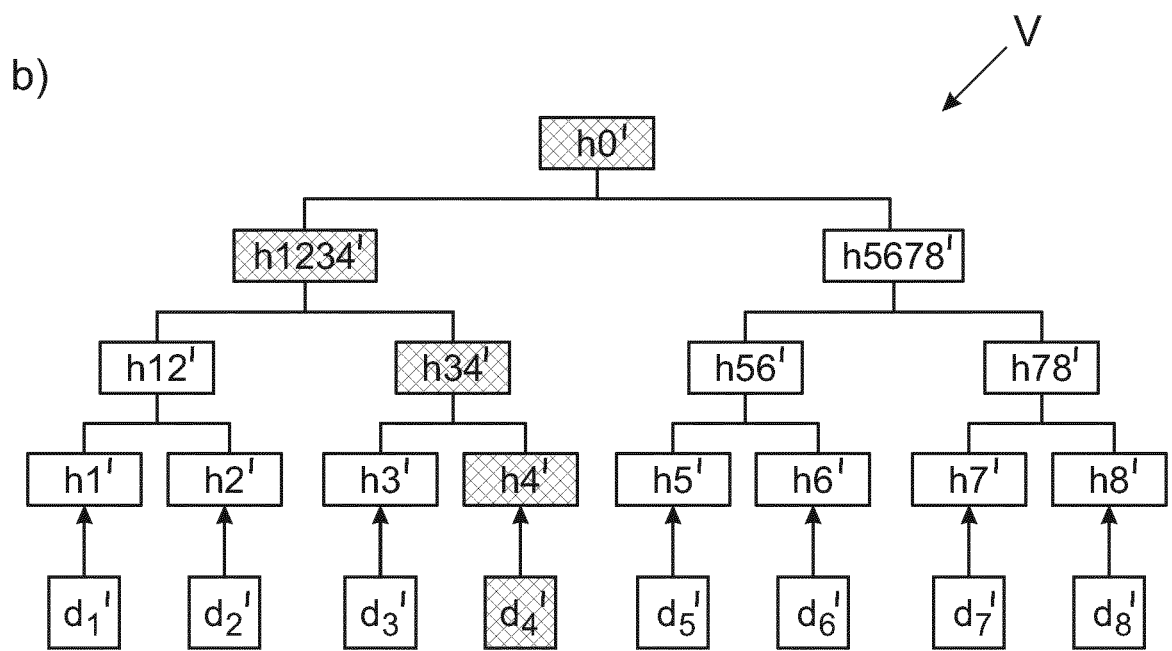

However, in the example shown in FIG. 3, the bioprocess data $d_4$ has been manipulated, which leads to the hashes h4', h34', h1234' and h0' being different from the hashes of the original hashes h4, h34, h1234 and h0. If the documentation data 23 are only based on the hash root h0, the recipient knows, that at least some data block $d_i$ is corrupted. If the documentation data 23 are only based on the complete hash tree H, the recipient may even derive by comparing the hash tree H to the verification hash tree V that data block $d_4$ is corrupted.

The above noted example shows, that by making the digital control unit 1 a trusted device regarding the signature of the documentation data 23, verification of the data integrity is possible with high reliability, and due to usage of above noted hashing, with low data processing and thereby hardware effort.

According to various embodiments, a bioprocess arrangement 2 with a proposed digital control unit 1 is provided. All explanations given before are fully applicable to this teaching.

According to another teaching, a method for operating the proposed digital control unit 1 is proposed as such, which represents the working principle of the proposed digital control unit 1. Again, reference is made to all explanations given before.

Various embodiments are directed to the use of the proposed digital control unit 1 for digitally signing the above noted documentation data 23 with the cryptographic private key 25. Again, all explanations given before are fully applicable.

Finally, various embodiments are directed to the data processing system for the realization of the above noted method, can include the local data storage 4 and the local processor unit 5, to a computer program product for the data processing system and to a computer readable storage media, on which the computer program product is stored.

The invention claimed is:

1. A digital control unit of a bioprocess arrangement for controlling a bioprocess,
   wherein the digital control unit comprises a local data storage and a local processor unit,
   wherein the digital control unit comprises a bioprocess interface for sending and receiving bioprocess control data,
   wherein the bioprocess interface comprises an actuator interface for sending actuator data to at least one actuator for influencing the bioprocess,
   wherein the bioprocess interface comprises a sensor interface for receiving sensor data related to the bioprocess from at least one sensor,
   wherein the digital control unit generates bioprocess data,
   wherein the digital control unit comprises a user interface for displaying to a user at least part of the bioprocess data and for receiving user control command data,
   wherein the digital control unit is configured to execute a bioprocess control routine via the local processor unit to control the bioprocess,
   wherein in the bioprocess control routine, the digital control unit receives the sensor data from the sensor,
   wherein in the bioprocess control routine, the digital control unit generates the actuator data based on the user control command data or the sensor data and controls the actuator by sending the actuator data to the actuator thereby influencing the bioprocess,
   wherein in the bioprocess control routine, the digital control unit generates the bioprocess data from the actuator data or the sensor data or the user control command data,
   wherein private key data are stored in the local data storage, that the digital control unit is configured to execute a data safety routine via the local processor unit, that the digital control unit is configured to execute a documentation routine via the local processor unit in the data safety routine, that in the documentation routine, the digital control unit generates documentation data from the bioprocess data,
   that the digital control unit is configured to execute a signing routine via the local processor unit in the data safety routine and that in the signing routine, the digital control unit extracts a cryptographic private key from the private key data and digitally signs the documentation data with the cryptographic private key by generating a digital signature.

2. The digital control unit according to claim 1, wherein the documentation routine comprises a step of grouping the bioprocess data into data blocks and a step of hashing the data blocks generating hashes of the data blocks and that the documentation data are generated from the hashes of the data blocks.

3. The digital control unit according to claim 2, wherein the documentation routine comprises a step of hashing the hashes of the data blocks in form of a tree structure into a hash root and that the documentation data are generated from the hash root.

4. The digital control unit according to claim 1, wherein the digital control unit executes the documentation routine during control of the bioprocess in the bioprocess control routine.

5. The digital control unit according to claim 1, wherein the step of grouping the bioprocess data into data blocks or the step of hashing the data blocks are initiated with the start of the bioprocess.

6. The digital control unit according to claim 1, wherein during at least part of a single bioprocess the digital control unit continuously receives the sensor data from the sensor in the bioprocess control routine and continuously sends actuator data to the actuator thereby influencing the bioprocess and that the signing routine is executed a first time and at least a further time during a single bioprocess, wherein a subsequent signing routine, which is based on a subsequent bioprocess data set, is being executed subsequently to a previous signing routine, which is based on a previous bioprocess data set.

7. The digital control unit according to claim 6, wherein the respective previous bioprocess data set and the respective subsequent bioprocess data set are overlapping each other.

8. The digital control unit according to claim 6, wherein the digital control unit adds an identifier of the respective previous bioprocess data set to the respective subsequent bioprocess data set.

9. The digital control unit according to claim 1, wherein in the signing routine, the digital control unit adds time stamps to the documentation data.

10. The digital control unit according to claim 1, wherein after receipt by the digital control unit, the sensor data or the user control command data are protected from external manipulation.

11. The digital control unit according to claim 1, wherein in the bioprocess control routine, the digital control unit generates the bioprocess data based on the sensor data, the actuator data, or the user control command data.

12. The digital control unit according to claim 11, wherein in the bioprocess control routine, the digital control unit generates a link information regarding a logical relation between at least part of the sensor data, the actuator data, or the user control command data and generates the bioprocess data also based on the link information.

13. The digital control unit according to claim 1, wherein the digital control unit is configured to execute a feedback routine for realizing a control loop thereby influencing the bioprocess.

14. The digital control unit according to claim 1, wherein the digital control unit has a casing, that the local processor unit and the local data storage are completely located in or on the casing, or, that the digital control unit is a mobile unit that can be moved with the local processor unit and the local data storage through a laboratory, or, that the bioprocess interface is connected via cables or short range wireless communication to the sensor or the actuator, or, that the user interface comprises a user display and a user input device located in or on the casing.

15. The digital control unit according to claim 1, wherein the bioprocess interface comprises a direct, electrical data-wise connection to the sensor or the actuator.

16. The digital control unit according to claim 1, wherein the digital signature generated by signing the documentation data is stored in the local data storage, or, that the digital control unit comprises a data transmission interface and that the digital control unit transmits the digital signature or the documentation data or the bioprocess data or parts of the respective data to an external data storage via the data transmission interface.

17. A bioprocess arrangement with a digital control unit according to claim 1, wherein the bioprocess arrangement comprises at least one actuator controlled by the actuator data.

18. A method for operating a digital control unit according to claim 1,
wherein the digital control unit generates bioprocess data,
wherein the digital control unit comprises a user interface for displaying to a user at least part of the bioprocess data and for receiving user control command data,
wherein the digital control unit is configured to execute a bioprocess control routine via the local processor unit to control the bioprocess,
wherein in the bioprocess control routine, the digital control unit receives the sensor data from the sensor,
wherein in the bioprocess control routine, the digital control unit generates the actuator data based on the user control command data and/or the sensor data and controls the actuator by sending the actuator data to the actuator thereby influencing the bioprocess,
wherein in the bioprocess control routine, the digital control unit generates the bioprocess data from the actuator data, the sensor data or the user control command data,
wherein private key data are stored in the local data storage, that the digital control unit is configured to execute a data safety routine via the local processor unit, wherein the digital control unit is configured to execute a documentation routine via the local processor unit in the data safety routine, wherein in the documentation routine, the digital control unit generates documentation data from the bioprocess data,
wherein the digital control unit is configured to execute a signing routine via the local processor unit in the data safety routine and wherein in the signing routine, the digital control unit extracts a cryptographic private key from the private key data and digitally signs the documentation data with the cryptographic private key by generating a digital signature.

19. A use of a digital control unit according to claim 1 for digitally signing the documentation data with the cryptographic private key,
wherein the digital control unit generates bioprocess data,
wherein the digital control unit comprises a user interface for displaying to a user at least part of the bioprocess data and for receiving user control command data,
wherein the digital control unit is configured to execute a bioprocess control routine via the local processor unit to control the bioprocess,
wherein in the bioprocess control routine, the digital control unit receives the sensor data from the sensor,
wherein in the bioprocess control routine, the digital control unit generates the actuator data based on the user control command data or the sensor data and controls the actuator by sending the actuator data to the actuator thereby influencing the bioprocess, wherein in the bioprocess control routine, the digital control unit generates the bioprocess data from the actuator data and/oror the sensor data and/oror the user control command data, wherein private key data are stored in the local data storage, that the digital control unit is configured to execute a data safety routine via the local processor unit, wherein the digital control unit is configured to execute a documentation routine via the local processor unit in the data safety routine, wherein in the documentation routine, the digital control unit generates documentation data from the bioprocess data, wherein the digital control unit is configured to execute a signing routine via the local processor unit in the data safety routine and wherein in the signing routine, the digital control unit extracts a cryptographic private key from the private key data and digitally signs the documentation data with the cryptographic private key by generating a digital signature.

20. A non-transitory computer readable storage media, on which a computer program product for a data processing system for realizing the method according to claim 18 is stored.

\* \* \* \* \*